(12) United States Patent
Wittrock et al.

(10) Patent No.: US 11,652,819 B2
(45) Date of Patent: May 16, 2023

(54) SECURE METHODS, SYSTEMS, AND MEDIA FOR GENERATING AND VERIFYING USER CREDENTIALS

(71) Applicant: Google LLC, Mountain View, CA (US)

(72) Inventors: John Wittrock, Brooklyn, NY (US); David Stein, New York, NY (US)

(73) Assignee: Google LLC, Mountain View, CA (US)

( * ) Notice: Subject to any disclaimer, the term of this patent is extended or adjusted under 35 U.S.C. 154(b) by 289 days.

(21) Appl. No.: 16/513,295

(22) Filed: Jul. 16, 2019

(65) Prior Publication Data

US 2020/0021588 A1 Jan. 16, 2020

Related U.S. Application Data

(60) Provisional application No. 62/698,662, filed on Jul. 16, 2018.

(51) Int. Cl.
*H04L 29/06* (2006.01)
*H04L 9/40* (2022.01)

(52) U.S. Cl.
CPC ...... *H04L 63/0884* (2013.01); *H04L 63/0823* (2013.01); *H04L 63/107* (2013.01); *H04L 63/126* (2013.01)

(58) Field of Classification Search
CPC ............. H04L 63/0884; H04L 63/0823; H04L 63/107; H04L 63/126
See application file for complete search history.

(56) References Cited

U.S. PATENT DOCUMENTS

| 7,945,776 | B1* | 5/2011 | Atzmony | H04L 9/3236 |
| | | | | 713/165 |
| 9,563,761 | B1 | 2/2017 | Ziraknejad | |
| 10,057,243 | B1* | 8/2018 | Kumar | H04L 9/321 |
| 10,637,665 | B1* | 4/2020 | Sundaresan | H04L 63/0815 |

(Continued)

OTHER PUBLICATIONS

International Search Report and Written Opinion dated Oct. 4, 2019 in International Patent Application No. PCT/US2019/042023, pp. 1-13.

(Continued)

*Primary Examiner* — Vance M Little
(74) *Attorney, Agent, or Firm* — Lerner David LLP

(57) ABSTRACT

Secure methods, systems, and media for generating and verifying user credentials are provided. In some embodiments, the method comprises: receiving, from a user device, a request for access to a service that requires valid user credentials; determining an aspect of the user credentials that is to be satisfied to grant access to the requested service; transmitting, to the user device, a request for information related to the aspect of the user credential; receiving, from the user device, information related to the aspect of the user credential, wherein the information has been signed using a key associated with the user device; verifying the key used to sign the information by the user device; in response to verifying the key used to sign the information, determining whether the aspect of the user credential has been satisfied based on the received information; and, in response to determining that the aspect of the user credential has been satisfied, granting access to the service.

21 Claims, 6 Drawing Sheets

(56) References Cited

U.S. PATENT DOCUMENTS

| | | | |
|---|---|---|---|
| 2005/0044197 A1* | 2/2005 | Lai | H04L 67/16 |
| | | | 709/223 |
| 2006/0259778 A1* | 11/2006 | Gudorf | H04L 63/10 |
| | | | 713/186 |
| 2007/0245148 A1 | 10/2007 | Buer | |
| 2011/0112969 A1 | 5/2011 | Zaid et al. | |
| 2012/0123935 A1* | 5/2012 | Brudnicki | G06Q 30/0601 |
| | | | 705/41 |
| 2014/0281498 A1* | 9/2014 | Bransom | H04L 9/321 |
| | | | 713/156 |
| 2014/0304517 A1* | 10/2014 | Chidambaram | H04L 9/32 |
| | | | 713/176 |
| 2014/0331060 A1 | 11/2014 | Hayton | |
| 2015/0200925 A1 | 7/2015 | Lagerstedt et al. | |
| 2015/0227727 A1* | 8/2015 | Grigg | H04W 12/63 |
| | | | 726/4 |
| 2015/0249540 A1 | 9/2015 | Khalil et al. | |
| 2015/0341340 A1 | 11/2015 | Lu et al. | |
| 2015/0365394 A1* | 12/2015 | Fitch | H04L 9/32 |
| | | | 726/7 |
| 2017/0085380 A1* | 3/2017 | Pandrangi | H04L 63/20 |
| 2017/0096123 A1* | 4/2017 | Gennermann | E05B 81/54 |
| 2017/0300901 A1* | 10/2017 | Kote | G06Q 20/3829 |
| 2018/0198616 A1* | 7/2018 | Feather | H04L 9/3263 |

OTHER PUBLICATIONS

Fromknecht, C. et al., "A Decentralized Public Key Infrastructure with Identitity Retention," available in IACR Cryptology ePrint Archive, Nov. 11, 2014. pp. 1-16.

International Search Report and Written Opinion in International Patent Application No. PCT/US2019/042023.

Ximenes, F. et al., "How a RESTful API server reacts to requests," O'Reilly Media, Dec. 28, 2017, pp. 1-47, available at: https://www.oreilly.com/ideas/how-a-restful-api-server-reacts-to-requests.

* cited by examiner

US 11,652,819 B2

SECURE METHODS, SYSTEMS, AND MEDIA FOR GENERATING AND VERIFYING USER CREDENTIALS

CROSS REFERENCE TO RELATED APPLICATIONS

This application claims the benefit of U.S. Provisional Patent Application No. 62/698,662, filed Jul. 16, 2018, which is hereby incorporated by reference herein in its entirety.

TECHNICAL FIELD

The disclosed subject matter relates to secure methods, systems, and media for generating and authenticating user credentials.

BACKGROUND

People frequently carry multiple forms of identification or multiple proofs of membership with them. For example, a person can carry a driver's license, which may be used for multiple purposes, such as to rent a car, to provide proof of age, etc. As another example, a person can carry multiple membership cards corresponding to different entities or businesses, such as a gym membership card, a discount card for a particular store, and/or any other suitable types of cards. It can, however, be cumbersome to carry so many different forms of identification. Additionally, in some cases, a particular aspect of a user identity may need to be verified (e.g., that a person is over the age of twenty-one years old, that a person's is greater than a voting age, etc.), but, when proving the particular aspect, that person may end up revealing additional identity information. For example, to provide a form of verification that a person is over the age of twenty-one years old, the person may present a driver's license, which may also reveal the person's address, the person's characteristics, the person's legal name, the person's organ donation option information, or other personal information. However, such individuals may desire to keep such identifying information private.

Accordingly, it is desirable to provide new methods, systems, and media for generating and verifying user credentials.

SUMMARY

Secure methods, systems, and media for generating and verifying user credentials are provided.

In accordance with some embodiments of the disclosed subject matter, a method for authenticating user credentials is provided, the method comprising: receiving, from a user device, a request for access to a service that requires valid user credentials; determining an aspect of the user credentials that is to be satisfied to grant access to the requested service; transmitting, to the user device, a request for information related to the aspect of the user credential; receiving, from the user device, information related to the aspect of the user credential, wherein the information has been signed using a key associated with the user device; verifying the key used to sign the information by the user device; in response to verifying the key used to sign the information, determining whether the aspect of the user credential has been satisfied based on the received information; and, in response to determining that the aspect of the user credential has been satisfied, granting access to the service.

In some embodiments, the method further comprises inhibiting access to the service in response to determining that the aspect of the user credential has not been satisfied.

In some embodiments, granting access to the service comprises actuating a lock to grant access to a location.

In some embodiments, verifying the key used to sign the information comprises querying an auditable ledger.

In some embodiments, the aspect of the user credential is an age of a user of the user device.

In some embodiments, the information related to the aspect of the user credential received from the user device comprises a portion of a user credential issued to the user device by a second user device.

In some embodiments, the portion of the user credential comprises permission for a user of the user device to access a location specified by the second user device.

In accordance with some embodiments of the disclosed subject matter, a system for authenticating user credentials is provided, the system comprising a memory and a hardware processor that, when executing computer executable instructions stored in the memory, is configured to: receive, from a user device, a request for access to a service that requires valid user credentials; determine an aspect of the user credentials that is to be satisfied to grant access to the requested service; transmit, to the user device, a request for information related to the aspect of the user credential; receive, from the user device, information related to the aspect of the user credential, wherein the information has been signed using a key associated with the user device; verify the key used to sign the information by the user device; in response to verifying the key used to sign the information, determine whether the aspect of the user credential has been satisfied based on the received information; and, in response to determining that the aspect of the user credential has been satisfied, grant access to the service.

In accordance with some embodiments of the disclosed subject matter, a non-transitory computer-readable medium containing computer executable instructions that, when executed by a processor, cause the processor to perform a method for authenticating user credentials is provided, the method comprising: receiving, from a user device, a request for access to a service that requires valid user credentials; determining an aspect of the user credentials that is to be satisfied to grant access to the requested service; transmitting, to the user device, a request for information related to the aspect of the user credential; receiving, from the user device, information related to the aspect of the user credential, wherein the information has been signed using a key associated with the user device; verifying the key used to sign the information by the user device; in response to verifying the key used to sign the information, determining whether the aspect of the user credential has been satisfied based on the received information; and, in response to determining that the aspect of the user credential has been satisfied, granting access to the service.

In accordance with some embodiments of the disclosed subject matter, a system for authenticating user credentials is provided, the system comprising: means for receiving, from a user device, a request for access to a service that requires valid user credentials; means for determining an aspect of the user credentials that is to be satisfied to grant access to the requested service; means for transmitting, to the user device, a request for information related to the aspect of the user credential; means for receiving, from the user device, information related to the aspect of the user credential, wherein the information has been signed using a key associated with the user device; means for verifying the key used to sign the information by the user device; means for determining whether the aspect of the user credential has been satisfied based on the received information in response to verifying the key used to sign the information; and means for granting access to the service in response to determining that the aspect of the user credential has been satisfied.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
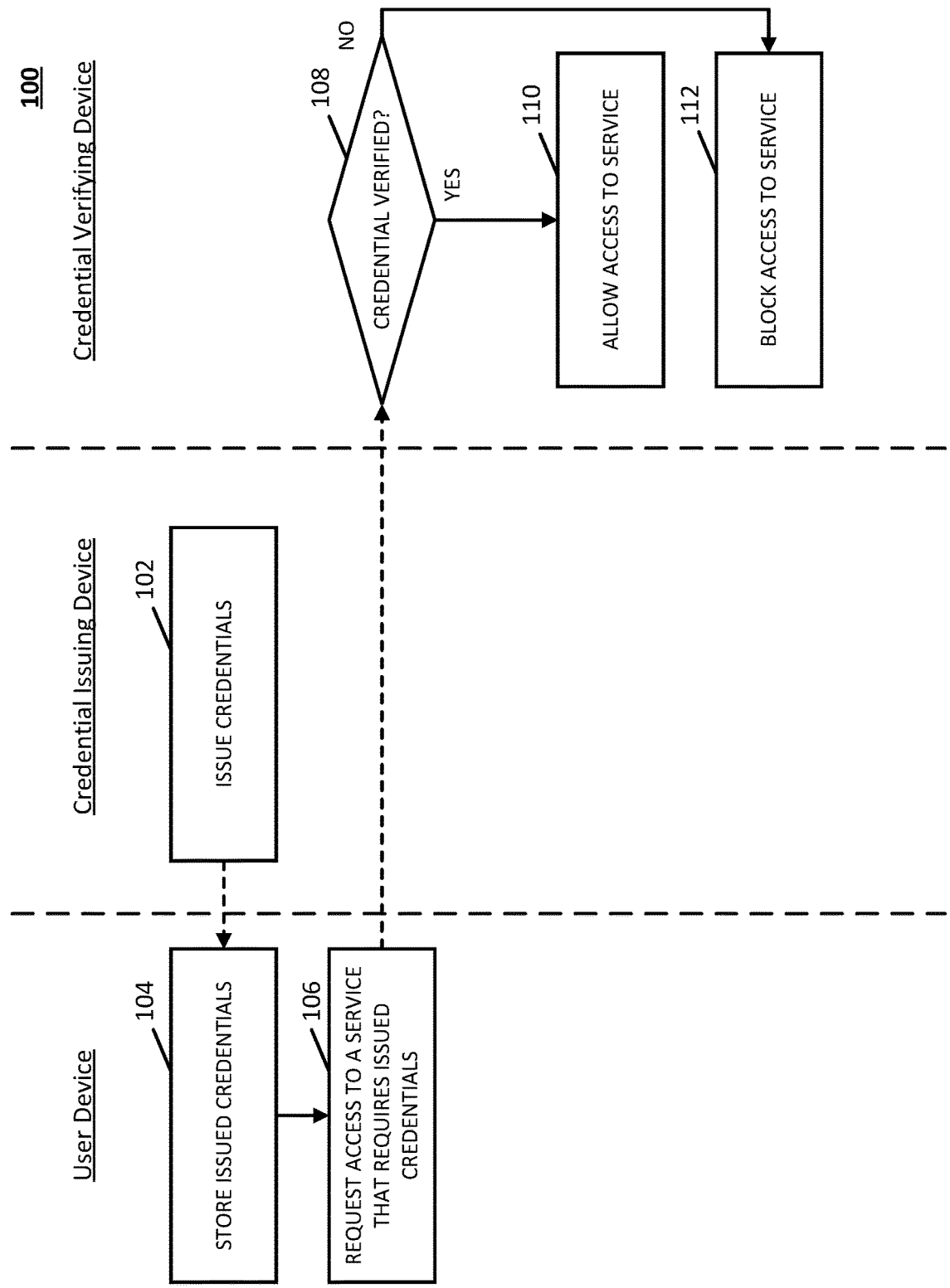
FIG. 1 shows an information flow diagram for generating and verifying user credentials in response to a request to access a service that requires the user credentials in accordance with some embodiments of the disclosed subject matter.

In accordance with various embodiments, mechanisms (which can include methods, systems, and media) for generating and authenticating user credentials are provided.

In some embodiments, the mechanisms described herein can be used to store and verify user credentials corresponding to any suitable entities or accounts for a particular user. For example, in some embodiments, the mechanisms described herein can be used to store and verify user credentials such as identifying information (e.g., a name of a user, a birthdate of a user, an address of the user, a citizenship of a user, and/or any other suitable identifying information), information indicating activities a user is authorized to perform (e.g., drive, borrow books from a particular library, and/or any other suitable activities), user accounts associated with different businesses or services (e.g., a bank account, an account associated with a vehicle sharing service, a gym membership, and/or any other suitable types of accounts), and/or any other suitable type of user credentials.

It should be noted that, although the embodiments described herein generally refer to user credentials and a user associated with a user device, this is merely illustrative and such credentials can be generated for any suitable entity. For example, in some embodiments, credentials can be generated for an autonomous vehicle. In another example, in some embodiments, credentials can be generated for an object, such as a package for delivery from one location to another.

In some embodiments, user credentials can be stored in any suitable manner. For example, in some embodiments, user credentials can be stored on a user device associated with a user. As a more particular example, in some embodiments, user credentials can be stored in an electronic wallet application of a user device, which can be used to manage and/or present user credentials. In some such embodiments, any suitable entities that issue user credentials (e.g., a bank, a gym, a government, and/or any other suitable entity) can communicate with an authorization server (e.g., to indicate that particular credentials have been issued) using an Application Program Interface (API) associated with the entity and the authorization server, as shown in and described below in more detail in connection with FIG. 4.

In some embodiments, the mechanisms described herein can provide verification of a portion of a user credential, thereby allowing an entity that requests verification of the portion of the user credential to verify only the portion without receiving additional information about a user. For example, in an instance where an entity requests verification that a user is older than a predetermined age (e.g., to allow delivery of a package that requires the user to be older than 21 years old, to allow purchase of a movie ticket that requires the user to be older than a predetermined age, etc.), the mechanisms can allow the entity to request verification that the user is older than a predetermined age, and the mechanisms can transmit an indication of whether the user is older than the predetermined age, thereby allowing the user to provide age verification without providing other personal information, such as an address.

Turning to FIG. 1, an example 100 of an information flow diagram for verifying user credentials in response to a request to access a service that requires the user credentials is shown in accordance with some embodiments of the disclosed subject matter. As illustrated, in some embodiments, process 100 can be executed by a user device, a credential issuing device, and a credential verifying device.

At 102, the credential issuing device can issue credentials to a user of the user device. In some embodiments, the user credentials can correspond to any suitable credentials associated with any suitable service or access to any suitable entity. For example, in some embodiments, the credential issuing device can issue user credentials that indicate identity information about the user (e.g., a name of the user, a birthdate of the user, an address of the user, and/or any other suitable type of information), user credentials that indicate activities the user is authorized to do (e.g., drive a car, vote, and/or any other suitable activity), and/or any other suitable type of information.

Note that, in some embodiments, the credential issuing device can be associated with any suitable organization or entity. For example, in some embodiments, the credential issuing device can be associated with a government (e.g., a local government, a national government, and/or any other suitable type of government). In some such embodiments, the credential issuing device can issue user credentials related to authorizations given by the government and/or information stipulated by the government. As another example, in some embodiments, the credential issuing device can be associated with an organization associated with a building the user of the user device lives in. In some such embodiments, the credential issuing device can issue user credentials related to authorizations given by management of the building, such as locations within the building the user is allowed to access, and/or any other suitable type of user credentials.

In some embodiments, user credentials can be issued in any suitable manner. For example, in some embodiments, the credential issuing device can set parameters or fields corresponding to a user identifier associated with the user of the user device, where each parameter or field indicates information about the user, an authorization of the user to perform a particular activity, and/or any other suitable credential information. In some embodiments, user credential information can be stored on the credential issuing device in any suitable manner, such as in a database that uses a user identifier as a key, and with fields associated with the key indicating information about the user, authorizations granted to the user, and/or any other suitable user credential information.

Note that, in some embodiments, issued user credentials can be encrypted in any suitable manner. For example, in some embodiments, user credentials can be encrypted using biometric information associated with the user. Additionally, in some embodiments, user credentials can be signed with a photo of the user, biometric information, and/or other identifying information of the user, thereby preventing the user credentials from being used by anyone other than the user of the user device.

At 104, the user device can store the issued user credentials. In some embodiments, the user device can store the issued user credentials in response to receiving the user credentials from the credential issuing device. In some embodiments, the user device can store the issued user credentials in any suitable manner. For example, in some embodiments, in instances where the user device is a mobile device (e.g., a mobile phone, a tablet computer, a wearable computer, and/or any other suitable type of user device), the user device can store the issued user credentials in connection with an application executing on the mobile device. As a more particular example, in some embodiments, the application can be an application for allowing a user to store user credentials associated with various entities to allow the user credentials to be used to access services provided by the entities. Additional examples of applications that can be used by the user device to store and provide user credentials are described below in connection with FIG. 4.

At 106, the user device can request access to a service that requires at least a portion of the issued credentials. In some embodiments, the user device can request access to any suitable service. For example, in some embodiments, the service can correspond to physical access to a particular building or area, such as a room in a building, access to a library, access to a gym, and/or any other suitable type of building or area. As another example, in some embodiments, the service can correspond to renting or borrowing equipment, such as renting or borrowing a vehicle, renting or borrowing of media content (e.g., a movie, a book, and/or any other suitable type of media content), and/or any other suitable type of item or equipment.

In some embodiments, the user device can request access to the service from a credential verifying device that provides access to the service. For example, in instances where the service corresponds to physical access to a building or an area of a building, the credential verifying device can be a smart lock or any other suitable type of access security device that verifies that the user of the user device is authorized to access the building or the area of the building prior to unlocking an associated door, opening an associated gate, etc. As another example, in instances where the service corresponds to renting or borrowing an item, the credential verifying device can correspond to a device operating in a kiosk (e.g., a self-checkout computer at a library, a kiosk at a bike share, and/or any other suitable type of device) that verifies that the user of the user device is authorized to rent or borrow the item and performs any suitable functions associated with renting or borrowing the item (e.g., charging the user a fee, indicating that the item has been rented or borrowed on a particular date, and/or any other suitable functions).

In some embodiments, the user device can request access to the service in any suitable manner. For example, in some embodiments, the user device can request access to the service via an application executing on the user device that is associated with the credential verifying device. Note that, in some embodiments, access to the service can be requested in any other suitable manner not involving the user device (e.g., via a display associated with the credential verifying device, by pushing a button associated with the credential verifying device, and/or in any other suitable manner). In some such embodiments, block 106 can be omitted.

At 108, the credential verifying device can verify a portion of the user credentials required to access the service. For example, in an instance where the service corresponds to access to a particular building or area, the credential verifying device can verify that the user is allowed to access the particular building or area. As a more particular example, in an instance where the request is to enter an apartment building or other residence, the credential verifying device can verify the user's address, and/or any other suitable information. As another example, in an instance where the service corresponds to renting or borrowing an item or equipment, the credential verifying device can verify that the user is authorized to rent or borrow the item or the equipment. As a more particular example, in an instance where the request is to rent or borrow a car, the credential verifying device verify that the user has a valid driver's license. As another more particular example, in an instance where the request is to rent or borrow an item, the credential verifying device can verify that the user has a valid account associated with the item (e.g., an account associated with a bike share, an account associated with a library, and/or any other suitable type of account).

In some embodiments, the credential verifying device can determine whether the user credentials are verified to grant access to the service in any suitable manner. For example, in an instance where the credential to be verified is that the user of the user device is authorized to enter a particular building, the credential verifying device can determine whether the user is authorized based on, for example, user credentials indicating an address of the user, and/or any other suitable information. As another example, in an instance where the credential to be verified is verification that the user of the user device is authorized to rent or borrow a car, the credential verifying device can determine whether the user has a valid driver's license.

In some embodiments, the credential verifying device can verify the portion of the credential based on any suitable information. For example, in some embodiments, the request for access to the service transmitted by the user device at block 106 can include any suitable information, such as a key that the user device used to sign the request (e.g., a public key associated with the user device and/or the service, and/or any other suitable key), and the credential verifying device can verify the credential by verifying the key and/or verifying that the key is current. In some such embodiments, the credential verifying device can verify the key and/or that the key is current by querying an auditable ledger (e.g., a blockchain, and/or any other suitable type of auditable ledger), as shown in and described below in more detail in connection with FIG. 4.

If, at 108, the credential verifying device determines that the user of the user device is authorized to access the requested service ("yes" at 108), the credential verifying device can allow access to the service at 110. For example, in instances where the service corresponds to access to a particular building or an area, the credential verifying device can actuate a lock or unlock a door associated with the building or the area, open a gate associated with the building or the area, and/or allow access to the building or the area in any other suitable manner. As another example, in instances where the service corresponds to renting or borrowing a particular item, the credential verifying device can update a log and/or any other suitable type of account indicating that the user of the user device has rented or borrowed the particular item.

If, at 108, the credential verifying device determines that the user of the user device is not authorized to access the requested service ("no" at 108), the credential verifying device can block access to the service at 112. For example, in instances where the service corresponds to access to a particular building or an area, the credential verifying device can leave a lock associated with a door to the building or the area locked, inhibit opening of a gate associated with the building or area, and/or block access in any other suitable manner. As another example, in instances where the service corresponds to renting or borrowing a particular item, the credential verifying device can cause a message to be presented indicating that the user of the user device is not allowed to rent or borrow the item.

Figure 2:
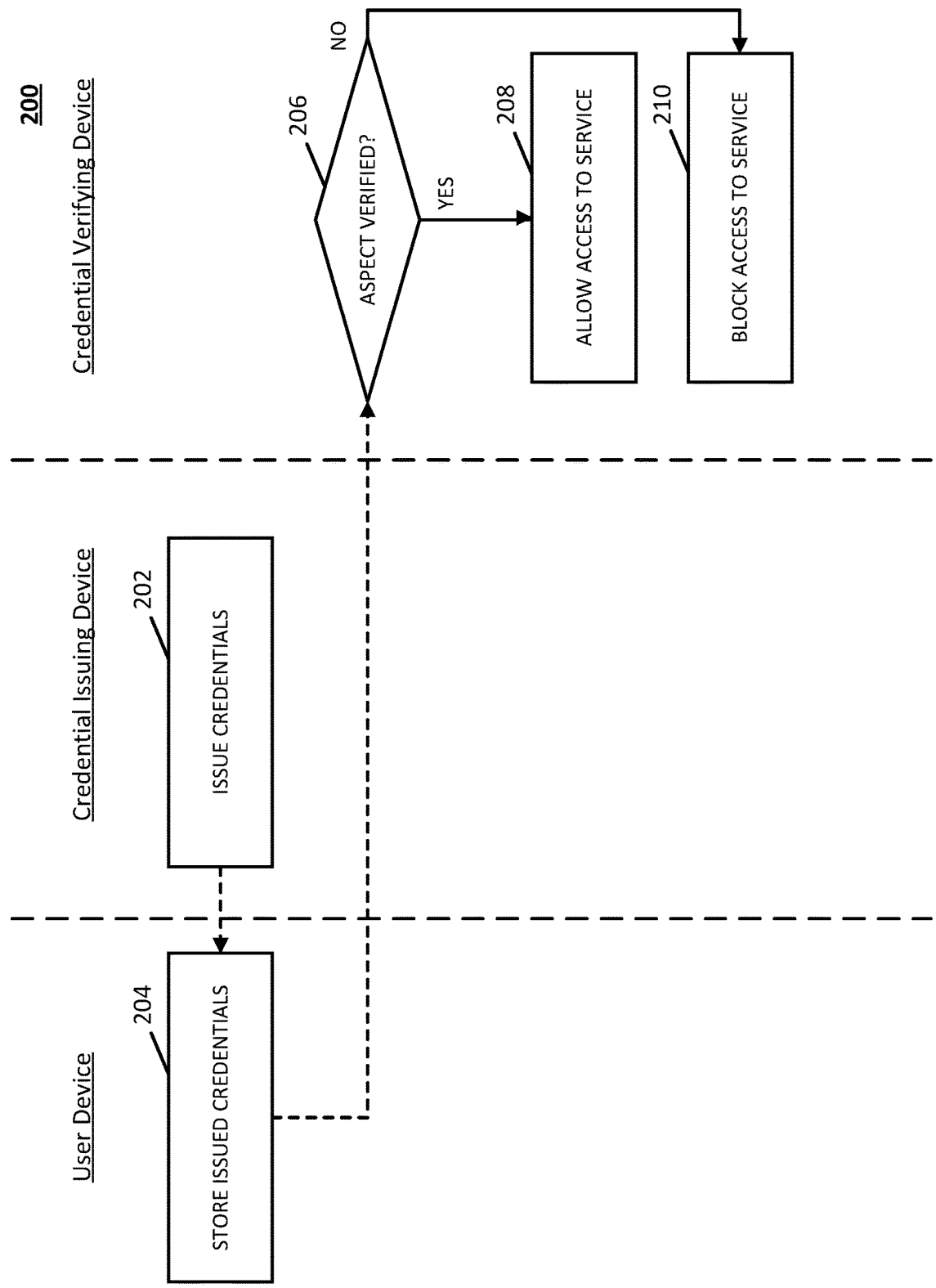
FIG. 2 shows an information flow diagram for verifying an aspect of a user credential in accordance with some embodiments of the disclosed subject matter.

Turning to FIG. 2, an example 200 of an information flow diagram for verifying an aspect of a user credential is shown in accordance with some embodiments of the disclosed subject matter. As illustrated, in some embodiments, blocks of process 200 can be executed on a user device, a credential verifying device, and/or a credential verifying device.

At 202, the credential issuing device can issue credentials to a user of the user device. Similarly to as described above in connection with block 102 of FIG. 1, in some embodiments, the user credentials can correspond to any suitable credentials associated with any suitable service or access to any suitable entity. For example, in some embodiments, the credential issuing device can issue user credentials that indicate identity information about the user (e.g., a name of the user, a birthdate of the user, an address of the user, and/or any other suitable type of information), user credentials that indicate activities the user is authorized to do (e.g., drive a car, vote, and/or any other suitable activity), and/or any other suitable type of information.

Similarly to as described above in connection with block 102 of FIG. 1, in some embodiments, user credentials can be issued in any suitable manner. For example, in some embodiments, the credential issuing device can set parameters or fields corresponding to a user identifier associated with the user of the user device, where each parameter or field indicates information about the user, an authorization of the user to perform a particular activity, and/or any other suitable credential information. In some embodiments, user credential information can be stored on the user device in any suitable manner, such as in a database that uses a user identifier as a key, and with fields associated with the key indicating information about the user, authorizations granted to the user, and/or any other suitable user credential information.

At 204, the user device can store the issued credentials. Similarly to as described above in connection with block 104 of FIG. 1, in some embodiments, the user device can store the issued user credentials in any suitable manner. For example, in some embodiments, in instances where the user device is a mobile device (e.g., a mobile phone, a tablet computer, a wearable computer, and/or any other suitable type of user device), the user device can store the issued user credentials in connection with an application executing on the mobile device. As a more particular example, in some embodiments, the application can be an application for allowing a user to store user credentials associated with various entities to provide the user credentials to access services provided by the entities.

At 206, the credential verifying device can verify an aspect of a user credential. Note that, in some embodiments, the credential verifying device can be associated with any suitable entity, such as a delivery service, a restaurant or bar, a movie theater, a service for renting or borrowing equipment, a building, etc. In some embodiments, the aspect of the user credential can include any suitable information about the user of the user device. For example, in some embodiments, the aspect of the user credential can include verification that an age of the user exceeds a predetermined age (e.g., that the user is over the age of twenty-one years old, and/or any other suitable age). As a more particular example, in an instance where the credential verifying device is associated with a bar or a similar establishment, the credential verifying device can request verification that the user is over the age of twenty-one years old (or verification that the user is at least a minimum drinking age for that location). As another example, in some embodiments, the aspect of the user credential can include verification that the user lives in a particular city or town. Note that, in some embodiments, the aspect of the user credential can include any suitable portion or item of information about a user that, for example, would be indicated in a user identifying document (e.g., a driver's license, a passport, and/or any other suitable identifying document) that can be independently verified without indicating other information included in the user identifying document to the credential verifying device. For example, in an instance where the aspect of the user credential is a verification that the user is older than a particular age, the credential verifying device can verify only the age of the user without receiving any other information about the user, such as an address of the user, a birthdate of the user, and/or any other suitable information.

In some embodiments, the credential verifying device can verify the aspect of the user credential in any suitable manner. For example, in some embodiments, the credential verifying device can transmit a message to the user device that includes an indication of the aspect of the user credential to be verified. As a more particular example, the message can include an indication that the aspect of the user credential to be verified is whether the age of the user is over a particular age, whether the user is a resident of a particular city, and/or any other suitable aspect. As another example, in some embodiments, the credential verifying device can transmit a message to the user device that requests particular information related to the aspect of the user credential, such as an age of the user, a city the user lives in, and/or any other suitable information related to the aspect of the user credential. Note that, in some embodiments, the requested verification can be requested via an API associated with the user device that can be used by the credential verifying device, as described below in more detail in connection with FIG. 4. In some such embodiments, the user device can then transmit an indication of the aspect of the user credential, for example, via a message transmitted from the user device to the credential verifying device. In some embodiments, the message can be signed using a key associated with the user device (e.g., a public key, and/or any other suitable type of key). In some embodiments, the credential verifying device can verify the aspect of the user credential by verifying the key used to sign the message (e.g., that the key is valid, that the key is current, and/or any other suitable verification). In some embodiments, the credential verifying device can verify the key in any suitable manner, for example, by querying an auditable ledger (e.g., a blockchain, and/or any other suitable type of auditable ledger), as shown in and described below in more detail in connection with FIG. 4.

The credential verifying device can determine if the aspect of the user credential is verified. For example, in an instance where the aspect of the user credential corresponds to verification that an age of the user of the user device is greater than a predetermined age, the credential verifying device can determine (e.g., based on the issued user credentials described above in connection with block 202), whether the age of the user is greater than the predetermined age required by the credential verifying device. As another example, in an instance where the aspect of the user credential corresponds to verification that the user lives in a particular city or town, the credential verifying device can determine whether the user lives in the particular city or town, as required by the credential verifying device. Note that, in some embodiments, the credential verifying device can determine if the aspect of the user credential is verified in response to determining that a key used to sign the message received from the user device has been successfully verified.

If, at 206, the credential verifying device determines that the aspect of the user credential has been verified ("yes" at 206), the credential verifying device can, at 208, allow access to a service that requires verification of the aspect of the user credential. For example, in an instance where the service is delivery of a package that requires that the user (e.g., a recipient of the package) is older than a predetermined age, the credential verifying device can allow delivery of the package. As another example, in an instance where the service corresponds to sale of a movie ticket for which the user must be older than a predetermined age, the credential verifying device can allow sale of the movie ticket. Note that, in some embodiments, the credential verifying device can allow access to the service based on verifying only particular aspects of user credentials required for the service, without receiving access to other information about the user.

Conversely, if, at 206, the credential verifying device determines that the aspect of the user credential has not been verified ("no" at 206), the credential verifying device can, at 210, block access to the service that requires verification of the aspect of the user credential. For example, continuing with the example given above in connection with block 208, the credential verifying device can inhibit delivery of a package that requires that a recipient be older than a particular age, inhibit sale of a movie ticket that requires a buyer to be older than a particular age, and/or block access to any other suitable service. Note that, in some embodiments, the credential verifying device can block access to the service based on receiving an indication that an aspect of user credentials was not successfully verified without receiving any other information about the user.

Figure 3:
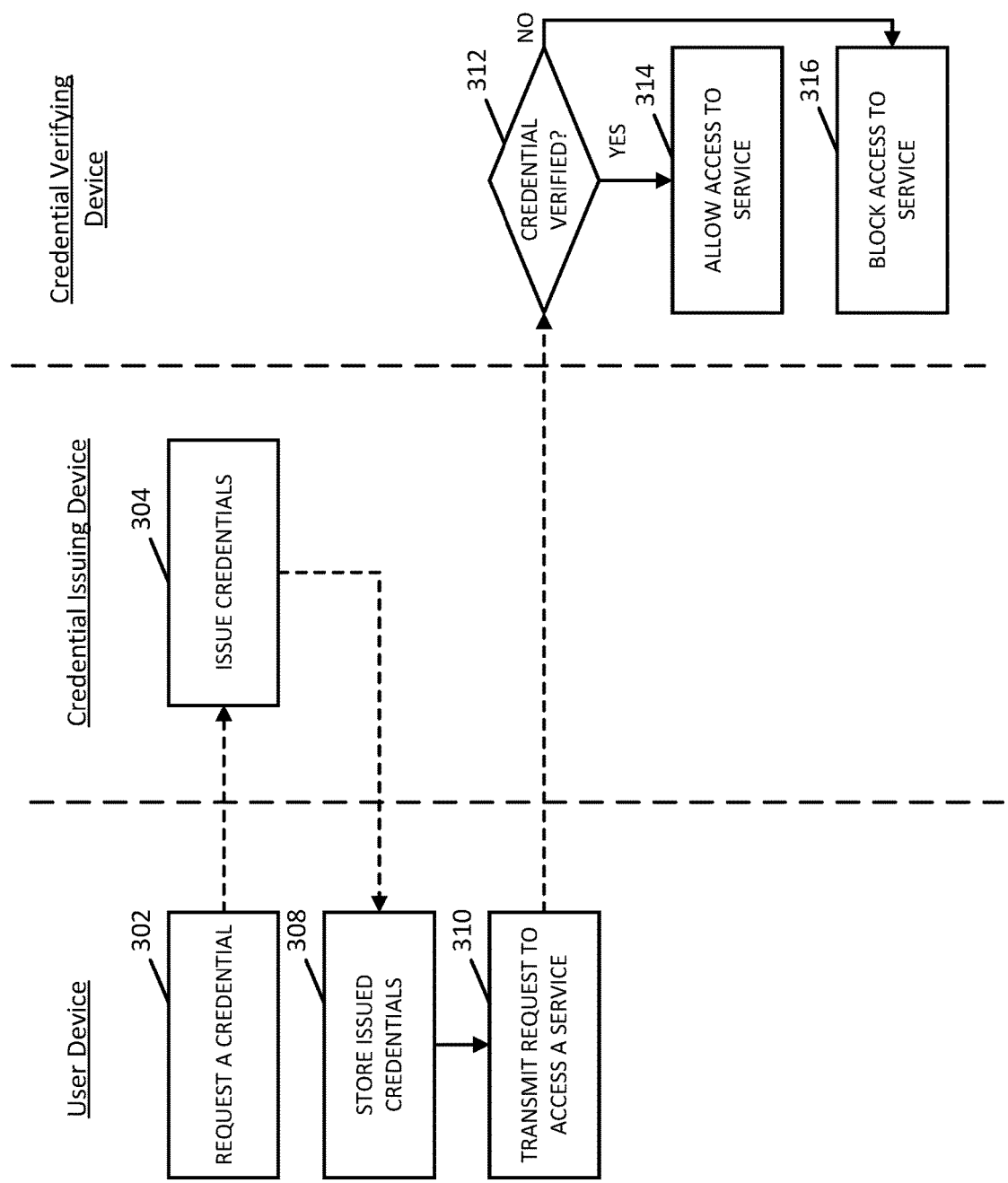
FIG. 3 shows an information flow diagram for storing and verifying user credentials issued by a third-party entity in accordance with some embodiments of the disclosed subject matter.

Turning to FIG. 3, an information flow diagram 300 for storing and verifying user credentials issued by a third-party entity is shown in accordance with some embodiments of the disclosed subject matter. As illustrated, in some embodiments, blocks of process 300 can be executed by a user device, a credential issuing device, and/or a credential verifying device.

At 302, the user device can request a user credential to be issued. In some embodiments, the user credential can be any suitable user credential issued by any suitable entity or organization. For example, in some embodiments, the user credential can be one issued by a third-party entity. As a more particular example, in some embodiments, the third-party entity can be a bank, a gym, a business (e.g., a retail business, and/or any other suitable type of business), a library, and/or any other suitable entity. As a specific example, in some embodiments, the user credential can be associated with a user account corresponding to the user of the user device and the third-party entity (e.g., a bank account at a bank, a gym membership at a gym, a discount club membership at a retailer, and/or any other suitable type of user account). As another more particular example, in some embodiments, the entity can be an individual, such as a friend, colleague, or other individual (e.g., a friend issuing credentials to allow a user of the user device to enter a home of the friend, an individual issuing credentials for a babysitter or housecleaner to enter a home of the individual, a parent issuing credentials to allow a babysitter to pickup a child from a school, and/or any other suitable individual).

At 304, the credential issuing device can issue the requested user credentials. In some embodiments, the credential issuing device can issue the requested user credentials in any suitable manner. For example, in some embodiments, in instances where the requested user credentials correspond to a user account associated with the credential issuing device, the credential issuing device can create the user account using any suitable information (e.g., a username associated with the user, a password for the user account, and/or any other suitable information). As another example, in some embodiments, in instances where the requested user credentials correspond to permission to enter a home of a user associated with the credential issuing device, the credential issuing device can create credentials that include any suitable information, such as an identifier of the user device allowed to enter the home, times the user device is allowed access to the home, and/or any other suitable information. In some embodiments, the credential issuing device can then transmit information associated with the issued user credentials to the user device. In some embodiments, the credential issuing device can transmit information associated with the issued user credentials to the user device using any suitable API, such as an API used by the user device and the credential issuing device, as described below in more detail in connection with FIG. 4.

At 308, the user device can store the issued user credentials. Similarly to as described above in connection with block 104 of FIG. 1 and block 204 of FIG. 2, in some embodiments, the user device can store the issued user credentials in any suitable manner. For example, in some embodiments, in instances where the user device is a mobile device (e.g., a mobile phone, a tablet computer, a wearable computer, and/or any other suitable type of user device), the user device can store the issued user credentials in connection with an application executing on the mobile device. As a more particular example, in some embodiments, the application can be an application for allowing a user to store user credentials associated with various entities to provide the user credentials to access services provided by the entities.

At 310, the user device can transmit a request to the credential verifying device to access a service associated with the credential verifying device. Note that, in some embodiments, the credential verifying device can be associated with any suitable entity. For example, in some embodiments, the credential verifying device can be associated with an entity different than the credential issuing device. As a more particular example, in some embodiments, in an instance where the credential issuing device is associated with a bank, the credential verifying device can be associated with any suitable entity requesting verification that the user of the user device has a bank account at the bank, such as an entity for processing a payment, and/or any other suitable entity. As another more particular example, in some embodiments, in an instance where the credential issuing device is associated with a parent, such as a parent issuing credentials for another caregiver to pick up a child from a school, the credential verifying device can be associated with the school.

In some embodiments, the request can include any suitable information, such as a portion or aspect of user credentials required by the credential verifying device to access the service. For example, in an instance where the service provided by the credential verifying device requires information associated with a bank, the portion or aspect of the user credentials can include an account number corresponding to a user account with the bank, and/or any other suitable information. As another example, in an instance where the credential verifying device is associated with a school, and the service is requesting permission by a user of the user device to pick up a child, the portion or aspect of the user credentials can include an identifier of the user device, an identifier of the credential issuing device (e.g., an identifier of a parent of the child that granted permission to pick up the child, and/or any other suitable identifier), and/or any other suitable information). In some embodiments, the request can be signed using a key associated with the user device (e.g., a public key, and/or any other suitable key).

At 312, the credential verifying device can verify the user credentials. In some embodiments, the credential verifying device can verify any suitable portion of the user credentials, such as that the user of the user device holds a valid account associated with the credential issuing device, that the user of the user device is allowed to perform an action specified by the credential issuing device (e.g., pick up a child from a school, enter a home associated with a user of the credential issuing device, and/or any other suitable action) and/or any other suitable portion or aspect of the user credentials.

In some embodiments, the credential verifying device can determine whether the user credentials are verified in any suitable manner. For example, in some embodiments, the credential verifying device can verify a key used to sign the request by the user device transmitted at block 310. For example, in some embodiments, the credential verifying device can verify that the key used to sign the request is current and/or otherwise valid. In some embodiments, the credential verifying device can verify the key in any suitable manner, for example, by querying an auditable ledger (e.g., a blockchain, and/or any other suitable auditable ledger), as shown in and described below in connection with FIG. 4.

If, 312, the credential verifying device determines that the user credential has been verified ("yes" at 312), the credential verifying device can, at 314, allow access to a service that requires verification of the user credential.

Conversely, if, at 312, the credential verifying device determines that the user credential has not been verified ("no" at 312), the credential verifying device can, at 316, block access to the service that requires verification of the user credential.

Figure 4:
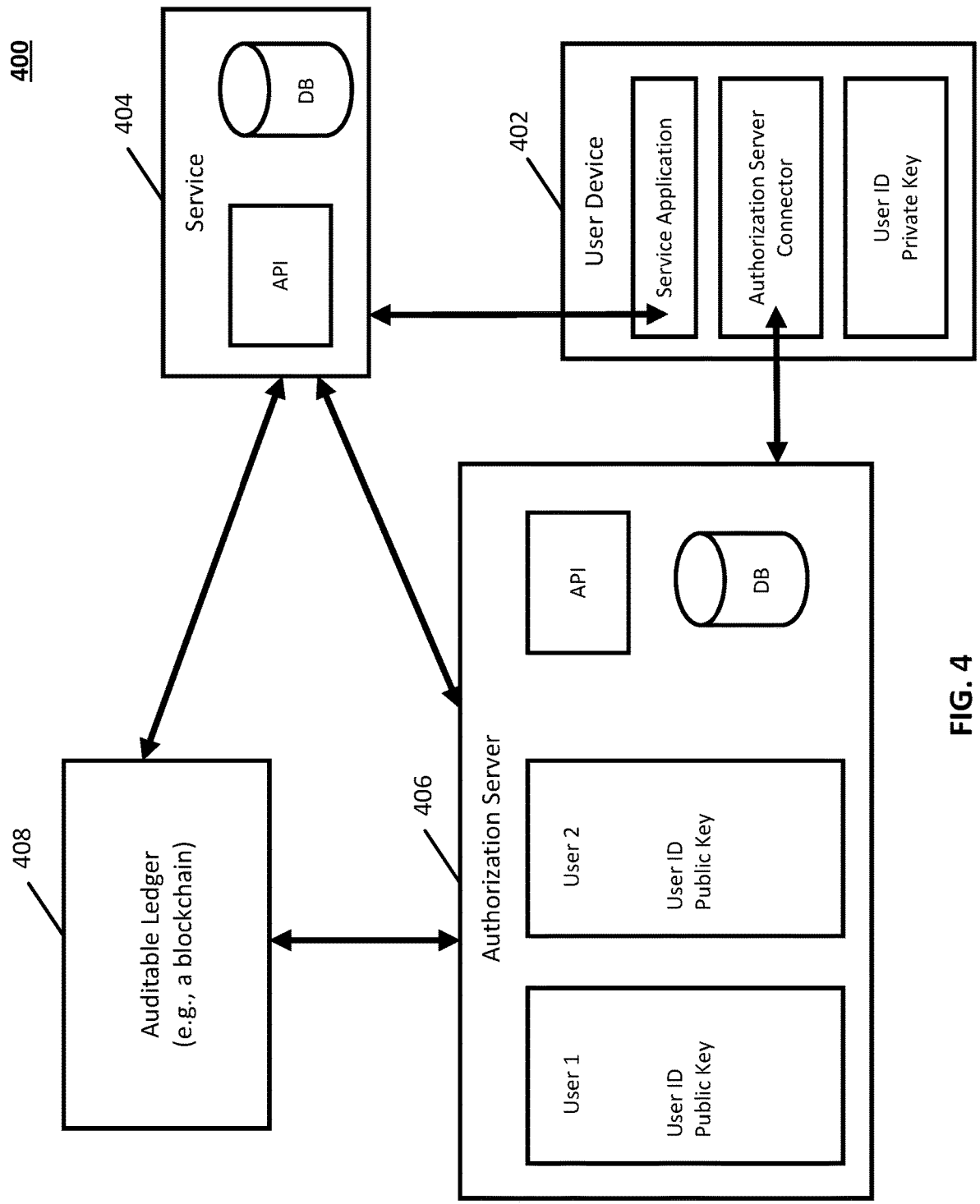
FIG. 4 shows a schematic diagram of interactions between a user device, a credential issuing server, a service that requires authentication of user credentials, and a log in accordance with some embodiments of the disclosed subject matter.

Turning to FIG. 4, an example 400 of a schematic diagram of the interactions between a user device, an authorization server, a service that requires authentication of user credentials, and a log is shown in accordance with some embodiments of the disclosed subject matter. In some embodiments, schematic 400 can include a user device 402, a service 404, an authorization server 406, and/or an auditable ledger 408.

In some embodiments, user device 402 can be any suitable type of user device, such as a mobile phone, a tablet computer, a wearable computer (e.g., a smart watch, smart glasses, and/or any other suitable type of wearable computer), and/or any other suitable type of user device. In some embodiments, user device 402 can store any suitable user credentials and/or can store user credentials using authorization server 406. In some embodiments, user device 402 can store any suitable applications that execute on user device 402 to interact with service 404. For example, in an instance where service 404 corresponds to a bank, user device 402 can store an application for interacting with a bank account associated with a user of user device 402 and the bank. Additionally, in some embodiments, user device 402 can store and/or execute any suitable applications or programs for interacting with authorization server 406, for example, to store or access issued user credentials.

In some embodiments, service 404 can correspond to any suitable entity. For example, as described above in connection with FIGS. 1-3, service 404 can correspond to a business (e.g., a bank, a gym, a business for renting or borrowing items or equipment, and/or any other suitable type of business), a government, an individual, and/or any other suitable type of entity. In some embodiments, service 404 can issue any suitable user credentials, such as identifying information for a user of user device 402 (e.g., a passport, a driver's license, and/or any other suitable type of identifying information), a user account associated with service 404 (e.g., a bank account, a gym membership, a discount club membership at a business, and/or any other suitable type of user account), permission to access a home of a user associated with service 404, and/or any other suitable type of user account. In some embodiments, service 404 can communicate with user device 402 via any suitable APIs. Additionally, in some embodiments, service 404 can communicate with authorization server 406 via any suitable APIs, for example, to transmit user credentials or information relating to user credentials to authorization server 406. In some embodiments, service 404 can store any suitable information (e.g., information associated with a user account, and/or any other suitable information) in a database stored on a server associated with service 404.

In some embodiments, authorization server 406 can be any suitable server for verifying user credentials, and/or performing any other suitable functions. In some embodiments, authorization server 406 can be associated with any suitable APIs for interacting with service 404 and/or user device 402. In some embodiments, authorization server 406 can store information associated with multiple users of multiple user devices, as shown in FIG. 4. For example, in some embodiments, for a first user, authorization server 406 can store a first user identifier, a public key associated with the first user identifier, and a private key used by authorization server 406 to communicate with a first user device associated with the first user. Continuing with this example, in some embodiments, authorization server 406 can store a corresponding second user identifier and corresponding public and private keys for a second user associated with a second user device. In some embodiments, authorization server 406 can store any suitable information associated with users in a database stored on authorization server 406, as illustrated in FIG. 4.

Note that, in some embodiments, an API for interacting with user device 402 can allow a user of user device 402 to recover any suitable user credentials. For example, in some embodiments, the API can be associated with a help button or a forgot credentials button, which can be used by the user to reset a password associated with a particular account, retrieve a username associated with a particular user account, and/or recover user credentials in any other suitable manner.

In some embodiments, auditable ledger 408 can be any suitable type of log or ledger used for recording or storing attributes associated with users, such as a user of user device 402. In some embodiments, auditable ledger 408 can be any suitable type of log or ledger, such as a blockchain. In some embodiments, auditable ledger 408 can store any suitable type of information, such as indications that a particular user has been issued a particular user account associated with a particular service, and/or any other suitable information. In some such embodiments, auditable ledger 408 can receive information from any suitable sources, such as authorization server 406 and/or service 404. For example, in some embodiments, authorization server 406 can update auditable ledger 408 to indicate a new user of authorization server 406, that new user credentials have been issued to a user, that user credentials have been issued, that particular credentials have been verified or not verified, and/or any other suitable information. As another example, in some embodiments, service 404 can update auditable ledger 408 to indicate creation of a new user account, pending expiration of an existing user account, and/or any other suitable information. In some embodiments, use of auditable ledger 408 can provide transparency regarding issuance of user credentials and/or use of user credentials. For example, in some embodiments, a user of user device 402 can access auditable ledger 408 to determine that no one else has used user credentials issued to the user of user device 402.

Figure 5:
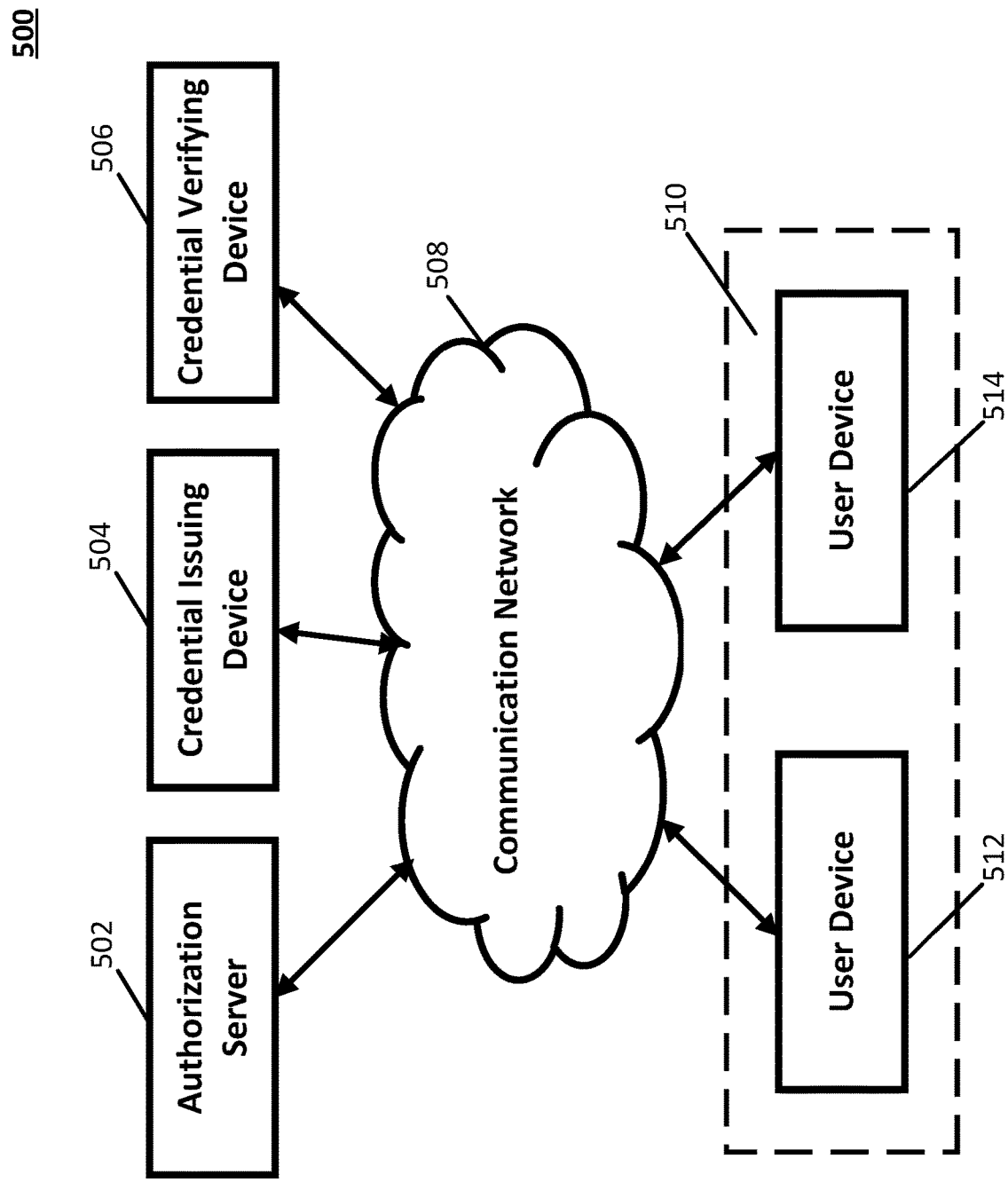
FIG. 5 shows a schematic diagram of an illustrative system suitable for implementation of mechanisms described herein for generating and authenticating user credentials in accordance with some embodiments of the disclosed subject matter.

Turning to FIG. 5, an example 500 of hardware for authenticating user credentials that can be used in accordance with some embodiments of the disclosed subject matter is shown. As illustrated, hardware 500 can include an authorization server 502, a credential issuing device 504, a credential verifying device 506, a communication network 508, and/or one or more user devices 510, such as user devices 512 and 514.

Authorization server 502 can be any suitable server(s) for storing information, data, programs, and/or any other suitable content for facilitating authorization of a user to access different services. For example, in some embodiments, authorization server 502 can issue credentials to a user, such as credentials to access an area of a building, credentials to reserve space in a public area or in a building, credentials to borrow or rent a vehicle, and/or any other suitable type of credentials, as described above in connection with FIG. 1. As another example, in some embodiments, authorization server 502 can provide any suitable functionality, such as through one or more APIs, for credential issuing device 504, to issue credentials (e.g., credentials related to an account, such as a bank account or a gym membership, and/or any other suitable type of credentials), as described above in connection with FIG. 3. As yet another example, in some embodiments, authorization server 502 can provide any suitable functionality, such as through one or more APIs, for credential verifying device 506 to verify an aspect of a user credential, such as that a user is over a particular age, that a user has a license to drive, and/or any other suitable aspect, as described above in connection with FIG. 2. Note that, in some embodiments, actions described herein as performed by an authorization server, such as authorization server 502 can be performed by credential issuing device 504 and/or credential verifying device 506. In some such embodiments, authorization server 502 can be omitted.

Credential issuing device 504 can be any suitable device for issuing user credentials. In some embodiments, credential issuing device can be associated with any suitable entity that issues credentials, such as a bank, a gym, a government, and/or any other suitable entity. In some such embodiments, credential issuing device can issue any suitable credentials to a user, such as a username and/or a password corresponding to an account for the user, and/or any other suitable type of credentials.

Credential verifying device 506 can be any suitable device used for verifying user credentials. For example, in some embodiments, credential verifying device 506 can be a smart security device, such as a smart lock, that verifies that a user is authorized to enter an area protected by the smart lock, as described above in connection with FIG. 1. As another example, in some embodiments, credential verifying device 506 can be a device associated with an entity such as a delivery service, that can request verification of a particular aspect of a user credential, such as whether a user is authorized to receive a delivery (e.g., based on an age of the user, and/or any other suitable aspect), as described above in connection with FIG. 2.

Communication network 508 can be any suitable combination of one or more wired and/or wireless networks in some embodiments. For example, communication network 508 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 510 can be connected by one or more communications links to communication network 508 that can be linked via one or more communications links to devices 502-506. The communications links can be any communications links suitable for communicating data among user devices 510 and devices 502-506, such as network links, dial-up links, wireless links, hard-wired links, any other suitable communications links, or any suitable combination of such links.

User devices 510 can include any one or more user devices suitable for storing credentials. For example, in some embodiments, user devices 510 can include a mobile phone, a tablet computer, a wearable computer, and/or any other suitable type of user device.

Although devices 502-506 are each illustrated as one device, the functions performed by devices 502-506 can be performed using any suitable number of devices in some embodiments. For example, in some embodiments, multiple devices can be used to implement the functions performed by each of devices 502-506.

Although two user devices 512 and 514 are shown in FIG. 5 to avoid over-complicating the figure, any suitable number of user devices, and/or any suitable types of user devices, can be used in some embodiments.

Devices 502-506 and user devices 510 can be implemented using any suitable hardware in some embodiments.

Figure 6:
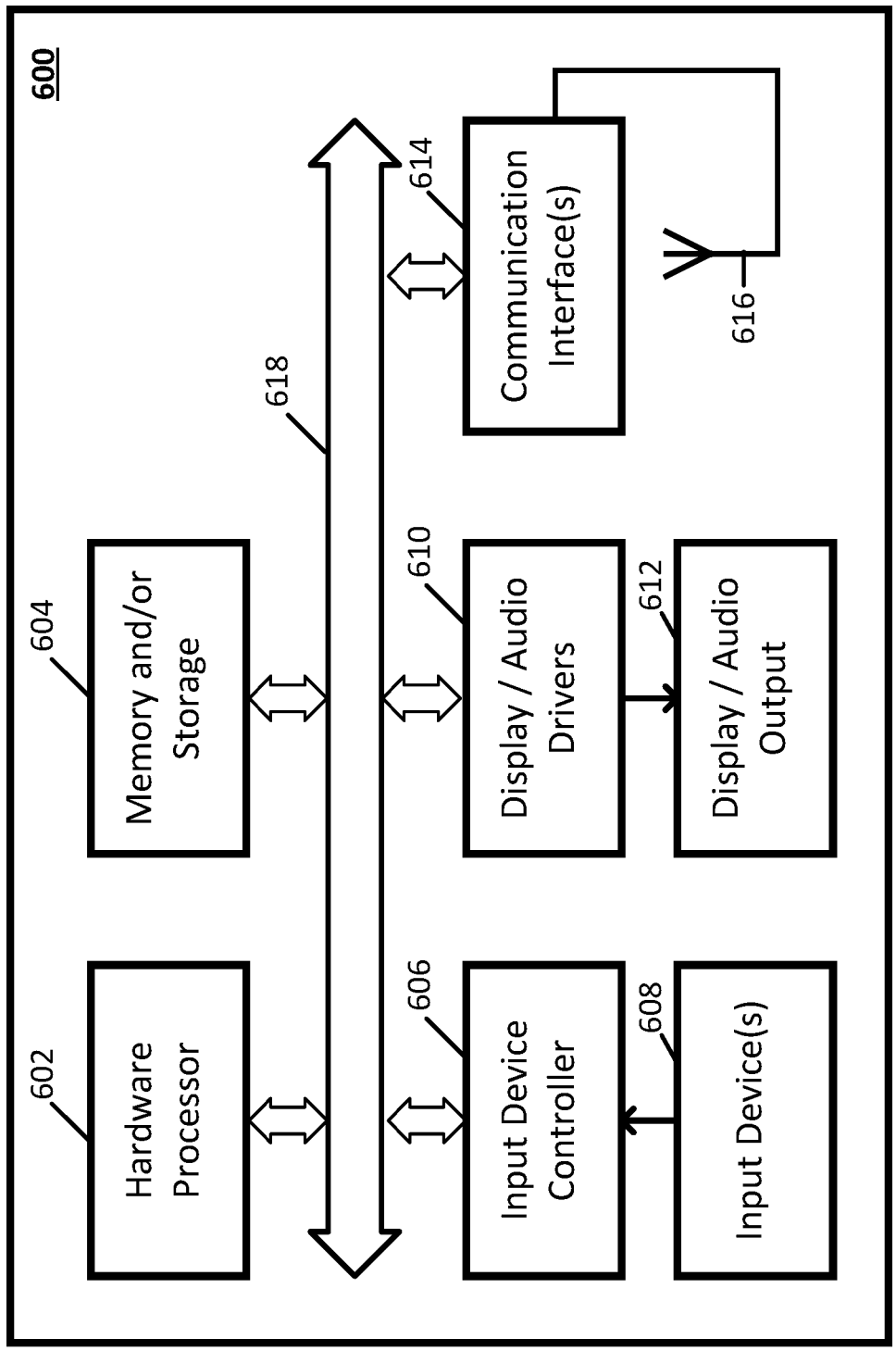
FIG. 6 shows a detailed example of hardware that can be used in a server and/or a user device of FIG. 5 in accordance with some embodiments of the disclosed subject matter.

For example, in some embodiments, devices 502-506 and 510 can be implemented using any suitable general purpose computer or special purpose computer. For example, a mobile phone may be implemented using a special purpose computer. Any such general purpose computer or special purpose computer can include any suitable hardware. For example, as illustrated in example hardware 600 of FIG. 6, such hardware can include hardware processor 602, memory and/or storage 604, an input device controller 606, an input device 608, display/audio drivers 610, display and audio output circuitry 612, communication interface(s) 614, an antenna 616, and a bus 618.

Hardware processor 602 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 602 can be controlled by a server program stored in memory and/or storage of a server, such as authorization server 502. For example, in some embodiments, the server program can cause hardware processor 602 to verify a user credential and/or an aspect of a user credential, and/or perform any other suitable functions. In some embodiments, hardware processor 602 can be controlled by a computer program stored in memory and/or storage 604 of user device 510. For example, the computer program can cause hardware processor 602 to store issued user credentials, request access to a service that requires a particular credential, and/or perform any other suitable functions.

Memory and/or storage 604 can be any suitable memory and/or storage for storing programs, data, and/or any other suitable information in some embodiments. For example, memory and/or storage 604 can include random access memory, read-only memory, flash memory, hard disk storage, optical media, and/or any other suitable memory.

Input device controller 606 can be any suitable circuitry for controlling and receiving input from one or more input devices 608 in some embodiments. For example, input device controller 606 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 610 can be any suitable circuitry for controlling and driving output to one or more display/audio output devices 612 in some embodiments. For example, display/audio drivers 610 can be circuitry for driving a touchscreen, a flat-panel display, a cathode ray tube display, a projector, a speaker or speakers, and/or any other suitable display and/or presentation devices.

Communication interface(s) 614 can be any suitable circuitry for interfacing with one or more communication networks (e.g., computer network 508). For example, interface(s) 614 can include network interface card circuitry, wireless communication circuitry, and/or any other suitable type of communication network circuitry.

Antenna 616 can be any suitable one or more antennas for wirelessly communicating with a communication network (e.g., communication network 508) in some embodiments. In some embodiments, antenna 616 can be omitted.

Bus 618 can be any suitable mechanism for communicating between two or more components 602, 604, 606, 610, and 614 in some embodiments.

Any other suitable components can be included in hardware 600 in accordance with some embodiments.

In some embodiments, at least some of the above described blocks of the processes of FIGS. 1-3 can be executed or performed in any order or sequence not limited to the order and sequence shown in and described in connection with the figures. Also, some of the above blocks of FIGS. 1-3 can be executed or performed substantially simultaneously where appropriate or in parallel to reduce latency and processing times. Additionally or alternatively, some of the above described blocks of the processes of FIGS. 1-3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media authenticating user credentials are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for authenticating user credentials, the method comprising:
   receiving, from a user device, a request for access to a service that requires valid user credentials, wherein a plurality of user credentials issued by one or more credential issuing devices are stored in an electronic wallet application executing on the user device;
   determining, based on the received request, which aspect of a user credential from one of the plurality of user credentials stored in the electronic wallet application that is to be satisfied to grant access to the requested service, wherein the aspect of the user credential is a portion of the user credential that is stored in the electronic wallet application;
   transmitting, to the user device, a request for information related to the aspect of the user credential;
   receiving, from the user device, information related to the aspect of the user credential that was stored in the electronic wallet application executing on the user device, wherein the information has been signed using a key associated with the user device;

verifying the key used to sign the information by the user device;

in response to verifying the key used to sign the information, determining whether the aspect of the user credential has been satisfied based on the received information; and in response to determining that the aspect of the user credential has been satisfied, granting access to the service.

2. The method of claim 1, further comprising inhibiting access to the service in response to determining that the aspect of the user credential has not been satisfied.

3. The method of claim 1, wherein granting access to the service comprises actuating a lock to grant access to a location.

4. The method of claim 1, wherein verifying the key used to sign the information comprises querying an auditable ledger.

5. The method of claim 1, wherein the aspect of the user credential is an age of a user of the user device.

6. The method of claim 1, wherein the information related to the aspect of the user credential received from the user device comprises a portion of a user credential issued to the user device by a second user device.

7. The method of claim 6, wherein the portion of the user credential comprises permission for a user of the user device to access a location specified by the second user device.

8. A system for authenticating user credentials, the system comprising:

a memory; and a hardware processor that, when configured to execute computer executable instructions stored in the memory, is configured to:

receive, from a user device, a request for access to a service that requires valid user credentials, wherein a plurality of user credentials issued by one or more credential issuing devices are stored in an electronic wallet application executing on the user device;

determine, based on the received request, which aspect of a user credential from one of the plurality of user credentials stored in the electronic wallet application that is to be satisfied to grant access to the requested service, wherein the aspect of the user credential is a portion of the user credential that is stored in the electronic wallet application;

transmit, to the user device, a request for information related to the aspect of the user credential;

receive, from the user device, information related to the aspect of the user credential that was stored in the electronic wallet application executing on the user device, wherein the information has been signed using a key associated with the user device;

verify the key used to sign the information by the user device;

in response to verifying the key used to sign the information, determine whether the aspect of the user credential has been satisfied based on the received information; and in response to determining that the aspect of the user credential has been satisfied, grant access to the service.

9. The system of claim 8, wherein the hardware processor is further configured to inhibit access to the service in response to determining that the aspect of the user credential has not been satisfied.

10. The system of claim 8, wherein granting access to the service comprises actuating a lock to grant access to a location.

11. The system of claim 8, wherein verifying the key used to sign the information comprises querying an auditable ledger.

12. The system of claim 8, wherein the aspect of the user credential is an age of a user of the user device.

13. The system of claim 8, wherein the information related to the aspect of the user credential received from the user device comprises a portion of a user credential issued to the user device by a second user device.

14. The system of claim 13, wherein the portion of the user credential comprises permission for a user of the user device to access a location specified by the second user device.

15. A non-transitory computer-readable medium containing computer executable instructions that, when executed by a processor, cause the processor to perform a method for authenticating user credentials, the method comprising:

receiving, from a user device, a request for access to a service that requires valid user credentials, wherein a plurality of user credentials issued by one or more credential issuing devices are stored in an electronic wallet application executing on the user device;

determining, based on the received request, which aspect of a user credential from one of the plurality of user credentials stored in the electronic wallet application that is to be satisfied to grant access to the requested service, wherein the aspect of the user credential is a portion of the user credential that is stored in the electronic wallet application;

transmitting, to the user device, a request for information related to the aspect of the user credential;

receiving, from the user device, information related to the aspect of the user credential that was stored in the electronic wallet application executing on the user device, wherein the information has been signed using a key associated with the user device;

verifying the key used to sign the information by the user device;

in response to verifying the key used to sign the information, determining whether the aspect of the user credential has been satisfied based on the received information; and in response to determining that the aspect of the user credential has been satisfied, granting access to the service.

16. The non-transitory computer-readable medium of claim 15, wherein the method further comprises inhibiting access to the service in response to determining that the aspect of the user credential has not been satisfied.

17. The non-transitory computer-readable medium of claim 15, wherein granting access to the service comprises actuating a lock to grant access to a location.

18. The non-transitory computer-readable medium of claim 15, wherein verifying the key used to sign the information comprises querying an auditable ledger.

19. The non-transitory computer-readable medium of claim 15, wherein the aspect of the user credential is an age of a user of the user device.

20. The non-transitory computer-readable medium of claim 15, wherein the information related to the aspect of the user credential received from the user device comprises a portion of a user credential issued to the user device by a second user device.

21. The non-transitory computer-readable medium of claim 20, wherein the portion of the user credential comprises permission for a user of the user device to access a location specified by the second user device.

\* \* \* \* \*